United States Patent [19]

Davies et al.

[11] Patent Number: 4,499,477

[45] Date of Patent: Feb. 12, 1985

[54] COVER ASSEMBLY FOR OPTICAL RECORDING MEDIUM

[75] Inventors: David H. Davies, Cupertino; Daniel E. Evanicky, Morgan Hill, both of Calif.

[73] Assignee: Minnesota Mining and Manufacturing Company, St. Paul, Minn.

[21] Appl. No.: 474,877

[22] Filed: Mar. 14, 1983

[51] Int. Cl.[3] .................... G01D 15/34; G01D 15/14; B29C 19/00

[52] U.S. Cl. .................... 346/137; 346/135.1; 346/76 L; 369/284; 156/245

[58] Field of Search .................... 346/135.1, 137

[56] References Cited

U.S. PATENT DOCUMENTS

| | | | |
|---|---|---|---|
| 4,037,251 | 7/1977 | Bricot et al. | 358/128 |
| 4,074,282 | 2/1978 | Balas, Jr. et al. | 346/135 X |
| 4,308,545 | 12/1981 | Lehureau et al. | 346/135.1 |
| 4,313,190 | 1/1982 | Slaten | 369/275 X |
| 4,331,966 | 5/1982 | Moe | 346/137 |
| 4,365,257 | 12/1982 | Gerfast | 346/135.1 X |

*Primary Examiner*—E. A. Goldberg
*Assistant Examiner*—Gerald E. Preston
*Attorney, Agent, or Firm*—Donald M. Sell; James A. Smith; William B. Barte

[57] ABSTRACT

A cover assembly for use with a disk-shaped optical recording medium, having two substantially identical halves, each having an inner surface adapted to provide upon assembly with the medium an air gap adjacent an optical recordable coating on the medium. Each cover half is transparent and has substantially no birefringent characteristics on the region overlying the air gap, thus allowing light to pass unimpeded therethrough. The cover assembly is adapted to be coupled to the central hub of the optical recording medium and to have a raised annulus adjacent thereto to support the assembly and minimize contact with the transparent portion.

13 Claims, 1 Drawing Figure

U.S. Patent  Feb. 12, 1985  4,499,477
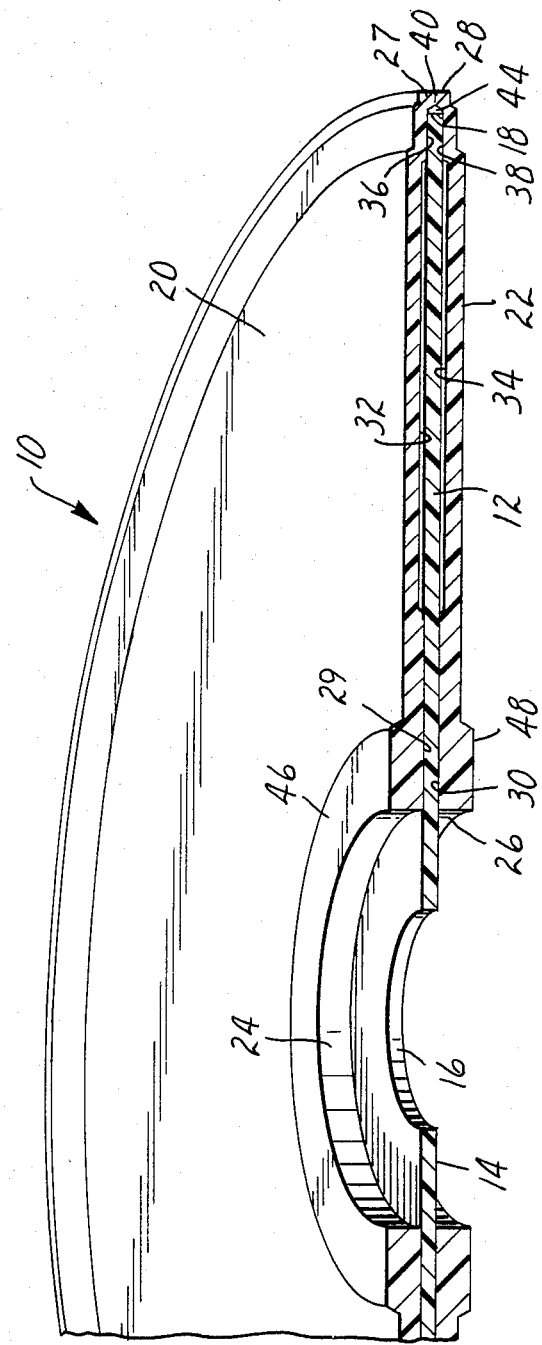

COVER ASSEMBLY FOR OPTICAL RECORDING MEDIUM

BACKGROUND OF THE INVENTION

This invention relates to optical recording media, and in particular, to such media in which means are provided for protecting the surface of an optically recordable layer from scratches, dirt, oxidation or other forms of chemical attack, or the like, which could optically interfere with recording and playback operations.

Various materials, configurations and methods have been earlier proposed to protect optical recording media. For example, in U.S. Pat. No. 4,037,251 (Bricot et al.) an optical recording medium is depicted in which a transparent protective layer is provided on top of a layer in which information, in the form of relief impressions, has already been formed. Not only must such a medium be formed in multiple steps, the last step being the application of the protective layer, but further, such a step must be performed after the medium is recorded upon, such as by a customer to whom recordable record blanks are provided, rather than allowing a protected record blank to be provided to begin with. Also, once the recordable layer is so protected, additional information cannot be readily recorded thereon, as is desirable with direct-read-after-write (DRAW) media, since the protective layer interferes with optical recording processes involving physical or chemical changes, to wit, ablation, gas evolution, bubble formation, etc.

In U.S. Pat. No. 4,308,545 (Lehureau et al.) an optical record disc is depicted which would avoid some of the limitations noted above, since a protective cover is provided as an intergral part of the blank record disc. Such a cover, purportedly made by inexpensively punching and shaping a metal sheet, provides an air gap between the inner surface of the cover and the surface of the light sensitive layer. Since the cover is metal, it is opaque and hence its use is restricted to an optical recording medium having a transparent substrate through which a record and/or playback light beam may pass.

In U.S. Pat. No. 4,331,966 (Moe), an optical record disc is depicted in which glass protective layers and an outer annular ring are combined to enclose a base member having a recessed annulus within which an information storage region is positioned, which top protective layer thus forms a protected space over the information storage region and a circumferential gap is provided to avoid stresses due to differential expansion effects. The assembly depicted is complex and requires numerous precisely machined or punched components, while the incorporated glass members are subject to shock induced breakage.

A simpler protected optical recording medium is depicted in U.S. Pat. No. 4,074,282 (Balas), wherein a disc shaped member having a radiation sensitive layer on one surface is maintained in a spaced relationship from a top protective transparent member via concentric sealing rings, which assembly fails to provide any protection against stress, differential expansion effect and the like.

SUMMARY OF THE INVENTION

In contrast to the prior art structures discussed above, the present invention comprises a cover assembly simple in construction and which yet provides exceptional protection and stability for an enclosed optical recording medium. The medium with which the cover assembly is adapted for use includes a disk-shaped substrate including a central aperture and outer periphery, and having an optically recordable coating on at least one major surface thereof extending at least between the aperture and the outer periphery. Preferably, the substrate of such a record medium is a substantially planar disc such as may be formed from a polymer such as polymethylmethacrylate, (PMMA) glass, metals, such as aluminum, or fiber filled polymers. Such a substrate will be provided with an optically sensitive coating on one or both major surfaces.

The cover assembly of the present invention comprises two substantially identical disk-like halves, each of which also has a central aperture and outer periphery, and is adapted to seal both sides of the substrate. The inner surface of each half thus includes a first substantially planar annulus adjacent to the aperture thereof adapted to be bonded to a like planar annulus on the substrate, a second substantially planar annulus extending radially outward from said first annulus and off-set relative thereto, adapted to be slightly spaced from the substrate surface over an annular region on which the optically recordable coating extends, a third substantially planar annulus adjacent to the outer periphery adapted partially support of the substrate upon assembly therewith and a portion on the outer periphery adapted to be bonded to corresponding member to thereby enclose the space between a said substrate and said second annulus. Preferably, the outer peripheral portion is adapted to extend beyond the periphery of the substrate and to be bonded to a like portion on the opposite half to seal the substrate therebetween. Each cover half in the region of the second annulus is formed of a material which is substantially transparent and has substantially no birefringent characteristics at the wavelength of the light to be used for subsequent recording and playback, thereby allowing a light beam at that wavelength to pass substantially unimpeded therethrough. The outer surface of each half further includes a raised, substantially planar annulus adjacent to the central aperture thereof for supporting the assembly, thereby minimizing contact with the portion of the halves overlying the recordable coating to prevent scratches and the like which would otherwise interfere with subsequent optical recording and playback.

DESCRIPTION OF THE DRAWING

The drawing is a perspective view of a protected optical recording medium, cut away to show a cross section thereof.

DESCRIPTION OF PREFERRED EMBODIMENTS

As shown in the drawing, the cover assembly 10 of the present invention encloses and thereby protects an optical recording medium 12 which comprises a substrate 14 having a central aperture 16 and an outer periphery 18. The substrate 14 further has an optical recording layer on one or both surfaces thereof (not shown). Such an optical recording medium 12 would typically comprise a reflector layer directly on the surface of the substrate, for example a layer of copper or silver, followed by a spacer layer, for example $SiO_2$ or an organic layer, and finally followed by a light-absorbing layer such as carbon. Numerous additional materials and alternative configurations are well known in the art. The substrate 14 may also consist of a variety of materials, including both metals and polymeric materials. Preferably, the substrate will be formed of a polymeric material such as polymethylmethacrylate (PMMA) or polycarbonate.

The cover assembly 10 initially, i.e., before assembly, is in the form of two substantially identical disk-like halves 20 and 22 respectively, and is preferably constructed of a polymeric, injection moldable, material having a low coefficient of optical birefringence. Polymeric materials suitable for such injection molding purposes would typically include PMMA and polycarbonate. As shown in FIG. 1, each half of the cover assembly extends laterally between an inner aperture 24 and 26 respectively to an outer periphery 27 and 28 respectively. The inner surface of each half, i.e., that surface which upon assembly will face a respective surface of the substrate 14 of the optical recording medium 12 enclosed therein includes, in a progression extending radially outward, the following regions:

(a) a first substantially planar annulus 29 and 30, respectively, adjacent to the central apertures 24 and 26, which are adapted to be bonded to a like planar annulus on the substrate 14. Thus, for example, if both the substrate 14 and each respective cover half 20 and 22 are formed from a similar polymeric material such as PMMA, the respective elements may be solvent or heat fused together over that annular region.

The inner surface of each half of the cover assembly next includes a second substantially planar annulus 32 and 34 respectively, which extends radially outward from the first annulus and is slightly off-set relative thereto, such that when the first annuluses 29 and 30 are bonded to the substrate 14 the second annuluses 32 and 34 will be slightly spaced from the substrate surface. It is within the region on the substrate encompassed by the second annuluses 32 and 34 that an optically recordable coating on the substrate will extend. To enable light to pass through the cover assembly to enable recording or playback from the enclosed optical recording medium, it is necessary that at least that portion of each cover assembly within the second annuluses 32 and 34 be formed of a substantially transparent material having substantially no birefringent characteristics in the infrared, that being the range of wavelengths desirably utilized during record and playback operations using a laser diode. In a preferred case, such a material will exhibit a birefringence of less than $\lambda/10$ in a single pass. Thus the remainder of each respective half of the cover assembly outside of the second annuluses 32 and 34 may be constructed of a different material altogether, or may be formed of a similar polymeric material appropriately dyed or pigmented to intentionally obscure other portions of the enclosed optical recording medium. It may also be preferred that each half of the cover assembly be injection molded of a single polymeric material such as PMMA exhibiting a low degree of birefrigence over the entire assembly.

The inner surface of each half 20 and 22 of the cover assembly next includes a third substantially planar annulus 36 and 38 respectively, each of which is substantially coplanar with the first respective annuluses 29 or 30, and is adapted to be substantially coplanar with the substrate 14 of an enclosed optical recording media. In one embodiment, the third annular regions 36 and 36 are desirably not to be bonded to the adjacent substrate surface, thereby enabling the presence of a minute gap between the assembled cover halves and the enclosed substrate 14. The combined members of each respective cover half and the enclosed substrate thus provide mutual support, and the gap allows limited independent movement of the peripheral portions of the substrate relative to the respective outer peripheral regions of the cover assembly, notwithstanding that the inner aperture regions of both are bonded together, to relieve stresses as could otherwise arise from differential expansion effects or the like.

Finally, each inner surface of each half 20 and 22 includes an outer annular portion 40, adjacent the outer periphery 27 and 28 respectively, which may extend beyond the periphery of the substrate 14. The outer portions 40 and 42 are adapted to be bonded to each other to thereby seal the substrate therebetween. In one embodiment, the outer portions 40 and 42 are dimensioned to extend beyond the outer periphery 18 of the substrate 14 to provide a circumferential gap 44 between the outer periphery of the substrate and the bonded portions 40 and 42 to allow slight radial expansion of the substrate as discussed above. In an alternative embodiment in which the third annular regions 36 and 38 are bonded to adjacent substrate surface upon assembly, the outer portions 40 and 42 may clearly be dimensioned to eliminate the gap 44.

Finally, as is further shown in FIG. 1, the outer surface of each of the halves 20 and 22 of the cover assembly include a raised, substantially planar annular portion 46 and 48 adjacent to the central apertures 24 and 26. Such an annular portion may be integrally molded with the remainder of each cover half or may be separately formed and bonded thereto. These raised portions provide support for the entire assembly while in use, thereby minimizing contact with the portion of the halves overlying the recordable coating, and further functions to prevent scratches and the like which would otherwise interfere with subsequent optical recording and playback operations.

In a typical embodiment, an optical recording medium to be enclosed within the cover assembly described in conjunction with FIG. 1 include a substrate having an outer diameter of approximately 300 mm, a central aperture of approximately 35 mm diameter and a thickness of approximately 1.2 mm. As the dimensions of each half of the cover assembly are adapted as appropriate, depending on the dimensions of the optical recording medium to be enclosed therein, a matching cover assembly would have an inner aperture approximately 68 mm in diameter, and an outer diameter of approximately 305.5 mm. The thickness of each cover half in the region extending between the inner surfaces 29 and 30 and the outer surfaces 46 and 48 respectively, is typically approximately 2.6 mm. such that the total dimensions of the assembly, including a substrate of approximately 1.2 mm. thickness, is approximately 6.4 mm.

The annular regions defined by the inner surfaces of the annuluses 32 and 34 typically extend between an inner diameter of approximately 140 mm. and an outer diameter of approximately 290 mm. and are offset from the first regions 29 and 30 to provide an air gap between the recording medium and cover assembly in the range of 0.1 to 1.0 mm., preferably extending between 0.2 and 0.6 mm. The thickness of each respective cover assembly in the region of the second annulus is preferably in the range of 1.2–1.5 mm, but may be as thin as 0.5 mm and as thick as 5.0 mm. the assembled cover halves together with an enclosed substrate is preferably in the range of 4.05±0.2 mm.

Finally, the dimensions of each cover half in the region of the third annulus 36 or 38 extend between an inner diameter of approximately 290 mm. and an outer diameter of approximately 302 mm. In an embodiment wherein the surfaces of the third annulus are directly bonded to the peripheral portions of the sandwiched substrate, the outer periphery of the third annular region will also be the overall outer periphery, and may terminate coplanar with the edge of the substrate. Alternatively, where the third annular region is desirably unbonded from the substrate, and partially supports the substrate in the outer peripheral regions, a small circumferential gap 44 is desirably left between the outer peripheral edge of the substrate and the inner surface of the contacted halves. In such an embodiment, each cover half extends beyond the edge of the substrate and terminates with a peripheral portion 27 or 28 adapted to be bonded to the respective matching portion on the opposite half to seal therebetween the substrate.

In one embodiment, each respective cover half may be constructed of a polymeric material such that the respective halves may be bonded at the outer peripheral portion 27 and 28 via thermal fusion techniques. Similarily, a layer of adhesive may be provided at that interface 40 and if desired, the thickness of such an adhesive layer may be tailored together with the extent of off-set between the third annuluses 36 and 38 and interface 40 such that the desired minute separation between the surfaces of the substrate and the inner surfaces 36 and 38 is automatically provided.

The cover assembly of the present invention has been determined to be particularly desirable as the added strength and rigidity of the two bonded cover halves results in an appreciably stiffer assembly, thereby improving the total indicated runout (TIR), i.e., the extent of vertical deflection of the assembly when rotated about its axis, such as would occur during record and playback operations. This reduction in TIR further makes possible the use of cheaper polymeric substrates, rather than more expensive substrates of metals such as aluminum. The cover assembly also protects the enclosed recordable medium against accumulated dust and debris which may interfer with subsequent reading and writing operations and also offers environmental protection to enable archivable lifetimes of the disk assembly in excess of approximately ten years, while not resulting in any appreciable loss of sensitivity. Rather, the raised air gap in the portions of the cover overlying the recordable area on the substrate provides thermal isolation over the optical recording medium, resulting in a more effective concentration of a laser beam utilized during writing operations into the recordable information site. Furthermore, the remoteness of the cover from the surface of the recordable layer eliminates any possible mechanical inhibition which would effect the formation of the pit or bubble of recorded information.

In the region of the first annulus 29 and 30, each cover half is desirably constructed to have chemical and physical properties similar to those of an accompanying substrate, thereby enabling the covers to be directly bonded to the substrate near the inner diameters of each respective member. As the covers are preferably bonded to each other at their outer periphery, in that region compatibility between the cover halves themselves is only necessary.

As noted above, the amount of adhesive at the interface of the outer periphery of each cover half may be utilized to control the dimension of the minute separation between the inner surfaces of each respective cover half and the outer periphery of the substrate. Such a separation thus relieves strain due to inequalities of thermal expansion and warping due to other stress factors which are more pronounced near the respective perimeters while the radial clearance of each respective cover half outside the outer periphery of the substrate allows room for expansion or contraction of the substrate relative to the cover assembly. These controlled gaps also assist in preventing the introduction of high frequency ripple onto the surface of the recording media, thereby making tracking by a focus servo system utilized during playback operations much more readily achieved.

In order to maximize the bond strength between the respective members, it is desirable to provide a cohesive bond of polymer to polymer rather than with an intervening substrate. Therefore, the peripheral bond between the respective cover halves is further preferred to be made beyond the perimeter of the substrate. This also eliminates process steps common in prior art assemblies, which require masking off of the outside edge of the substrate to enable bonding of the outer perimeters of the cover halves and substrates together.

In forming the overall assembly, each respective cover half is typically injection molded or cast from PMMA or a similar moldable, low birefringence material. A suitable adhesive is then applied in the region at the outer periphery of each respective cover half. One cover half is then placed with the adhesive side up on a concentric locating fixture. A pretested substrate with a recordable layer on one or both sides thereof is then placed atop the lower cover half using the same fixture, and the second cover half is then keyed with the concentric locating fixture to the substrate and the lower cover half. The members are then clamped until a bond is appropriately formed. During subsequent read and write operations, it has been found desirable to provide for the locating hub of the drive assembly to clamp either to the raised inner peripheries of the assembled cover assembly or onto the substrate itself.

A number of variations in the types of adhesives used to bond the respective cover halves together have been identified. Thus for example, depending on the material utilized for each respective cover half, solvents such as methylene chloride or monomers such as methylmethacrylate or acrylic acid may desirably be utilized to provide a high strength chemical bond. The latter monomers have been found to provide the best bond strength and weather resistance. Similarly, monomer and polymer blends together with appropriate catalysts as well as conventional expoxies have been found to be quite suitable. Similarly, where subsequent disassembly of the respective cover halves is desired, thermoplastic adhesives are also desirably utilized, such that subsequent heating operations may be utilized to free the respective cover halves. Pressure sensitive acrylic adhesives are also desirably utilized. As is well known to those skilled in the art, the various adhesives selected for use in the bonding operation may be applied by a variety of techniques including the application via a syringe, and transfer or screen printing via the use of tape preforms and via spray coatings.

The benefits obtained with the cover assembly of the present invention in improving the total vertical run out of the resultant assembly is particularly evident in measurements of the vertical displacement of the assembly, utilizing a conventional capacitive probe technique. Thus, for example, it has been determined that a total indicated run out in the vertical direction with a typical assembly turning at a rotational rate of 1800 rpm, is in the range of 165 micrometers at the outer radius of the disk. In contrast, prior art optical recording disks having protective covers as taught in the prior art have been observed to typically exhibit a total vertical indicated runout when measured under the same conditions several times higher. For example, when a number of such competitive disks were measured, nearly forty percent exceeded an arbitrarily allowable limit of total indicated runout of 400 micrometers, while 75 percent of such disks exceeded the 165 micrometer TIR typically obtained with the assembly of the present invention.

We claim:

1. A cover assembly adapted for use with an optical recording medium having a disk-shaped substrate including a central aperture and outer periphery and having an optically recordable coating on at least one major surface thereof extending at least between the central aperture and outer periphery, wherein said cover assembly comprises two substantially identical disk-like halves each of which is a single, integrally molded construction having a central aperture and outer periphery,
   (a) the inner surface of each half including
      (i) a first substantially planar annulus adjacent to the central aperture thereof adapted to be bonded to a like planar annulus on said substrate,
      (ii) a second substantially planar annulus extending radially outward from said first annulus and off-set relative thereto, adapted to be slightly spaced from a said substrate surface over an annular region on which a said optically recordable coating extends, said cover half in the region of said second annulus being formed of a material which is substantially transparent and has substantially no birefringent characteristics at the wavelength of the light to be used for subsequent recording and playback, thereby allowing a light beam having said wavelength to pass substantially unimpeded therethrough,
      (iii) a third substantially planar annulus adjacent to said outer periphery adapted to partially support said substrate upon assembly therewith, and
      (iv) a portion on the outer periphery adapted to be bonded to a corresponding member of an opposing half to thereby enclose the space between said substrate and said second annulus, and
   (b) the outer surface of each half including a raised, substantially planar annulus adjacent to the central aperture thereof for supporting the assembly, thereby minimizing contact with the portion of the halves overlying the recordable coating to prevent scratches and the like which would otherwise interfere with subsequent optical recording and playback.

2. A cover assembly according to claim 1, wherein each cover half in the region of said second annulus is formed of polymethylmethacrylate or polycarbonate.

3. A cover assembly according to claim 1, wherein said halves of the cover assembly and said substrate of an optical recording medium to be enclosed therein are formed of materials having substantially the same coefficients of expansion and wherein the inner surface of each half of the cover assembly in the region of the third planar annulus is adapted to be bonded to a matching outer peripheral surface of the substrate.

4. A cover assembly according to claim 1, wherein the inner surface of each half of the cover assembly in the region of the third planar annulus is adapted to provide a minute gap between and to partially support said substrate upon assembly therewith, while allowing independent movement of the respective peripheral regions, and wherein the inner surface of each outer peripheral portion of each half of the cover assembly is dimensioned to provide upon assembly a circumferential gap between the outer periphery of the enclosed substrate and the inside surface of the mated halves to allow radial expansion of the substrate relative to the cover assembly.

5. A cover assembly according to claim 1, further comprising means for bonding the inner surface of each half in the region of said first annulus to said substrate and for bonding the inner surfaces in the region of said outer peripheral portions to each other.

6. A cover assembly according to claim 5, wherein said outer peripheral portions include a substantially planar section parallel to said third annulus and off-set relative thereto an amount approximately one-half the thickness of a said substrate to be enclosed therein, and wherein the means for bonding said outer peripheral portions together comprises a layer of organic adhesive on said planar sections, the thickness of which is sufficient to slightly separate said outer peripheral portions, thereby defining the minute gap between the third annulus and substrate.

7. In a record medium adapted for recording thereon by a radiant energy beam, said medium including a disk-shaped substrate having a central aperture and outer periphery, an optically recordable coating overlying a substantial portion of at least one major surface of said substrate extending between said central aperture and outer periphery, and a cover assembly enclosing said substrate and recordable coating thereon, the improvement wherein said cover assembly comprises two substantially identical disk-like halves each of which is a single, integrally molded construction having a central aperture and outer periphery,
   (a) the inner surface of each half including
      (i) a first substantially planar annulus adjacent to the central aperture thereof bonded to a like planar annulus on said substrate,
      (ii) a second substantially planar annulus extending radially outward from said first annulus, generally parallel to and spaced away from said substrate to provide a gap between said second annulus and that portion of said substrate surface over which said optically recordable coating overlies, each cover half in the region of said second annulus being formed of a material which is substantially transparent and has substantially no birefringent characteristics at the wavelength of light to be used for subsequent recording and playback, thereby allowing a light beam having said wavelength to pass substantially unimpeded therethrough,
      (iii) a third substantially planar annulus adjacent to the outer periphery of each half of the cover assembly and in partial contact with said substrate, to at least partially support said substrate, and
      (iv) a portion on the outer periphery of each half bonded to a corresponding member of an opposing half to thereby enclose the space between said substrate and said second annulus, and (b) the outer surface of each half including a raised, substantially planar annulus adjacent to the central aperture thereof for supporting the assembly, thereby minimizing contact with the portion of the halves overlying the recordable coating to prevent scratches and the like which would otherwise interfere with subsequent optical recording and playback.

8. In a record medium according to claim 7, wherein each cover half in the region of said second annulus of the cover assembly is formed of polymethylmethacrylate or polycarbonate.

9. In a record medium according to claim 7, wherein said cover assembly further comprises means for bonding said first annulus to said substrate and for bonding said outer peripheral portions of each half to each other.

10. In a record medium according to claim 9, wherein said outer peripheral portions include a substantially planar section parallel to said third annulus and off-set relative thereto an amount approximately one-half the thickness of said substrate, and wherein the means for bonding said outer peripheral portions together comprises a layer of organic adhesive on said planar sections, the thickness of which is sufficient to slightly separate said outer peripheral portions, thereby defining the minute gap between the third annulus and substrate.

11. In a record medium according to claim 7, wherein said substrate and said first annulus of each half of the cover assembly are formed of a similar material, and wherein said substrate and first annuluses are chemically bonded together.

12. In a record medium according to claim 11, wherein said substrate and first annuluses are formed of polymethylmethacrylate.

13. In a record medium according to claim 7, wherein the substantially planar inner surface of each half of the cover assembly in the region of the third annulus is dimensioned to be parallel to and laterally offset from said substantially planar inner surfaces of the outer peripheral portions an amount slightly greater than one-half the thickness of the substrate, and wherein the outer peripheral portions are directly chemically bonded together, the lateral offset thereby resulting in a minute gap between the substrate and the inner surface of the assembled halves in the region of the third annulus.

* * * * *